United States Patent
Ballard (10) Patent No.: US 6,727,916 B1
(45) Date of Patent: Apr. 27, 2004

(54) METHOD AND SYSTEM FOR ASSISTING A USER TO ENGAGE IN A MICROBROWSER-BASED INTERACTIVE CHAT SESSION

(75) Inventor: Barbara Ballard, Lecompton, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 445 days.

(21) Appl. No.: 09/746,702

(22) Filed: Dec. 21, 2000

(51) Int. Cl.[7] .............................................. G06K 15/00
(52) U.S. Cl. ....................................... 345/758; 345/864
(58) Field of Search ........................ 345/864, 786–787, 345/752, 758, 760, 853, 854, 855, 475, 179, 544, 1.3, 2.3, 3.1, 5, 866, 863, 702–703, 860, 712, 784–785, 756, 755, 754; 235/486, 492

(56) References Cited

U.S. PATENT DOCUMENTS

| | | | | |
|---|---|---|---|---|
| 5,880,731 A | * | 3/1999 | Liles et al. .................. | 345/758 |
| 6,285,916 B1 | * | 9/2001 | Kadaba et al. .............. | 700/222 |
| 6,346,952 B1 | * | 2/2002 | Shtivelman ................. | 345/758 |
| 6,400,381 B1 | * | 6/2002 | Barrett et al. ............... | 345/758 |
| 6,427,918 B1 | * | 8/2002 | Endejan et al. ............. | 235/486 |
| 6,430,409 B1 | * | 8/2002 | Rossmann .................. | 455/422 |
| 6,430,574 B1 | * | 8/2002 | Stead ....................... | 707/104.1 |
| 6,519,771 B1 | * | 2/2003 | Zenith ......................... | 725/32 |
| 6,538,665 B2 | * | 3/2003 | Crow et al. ................. | 345/723 |
| 6,590,594 B2 | * | 7/2003 | Bates et al. ................. | 345/784 |

OTHER PUBLICATIONS

Barbara Ballard and Bob Miller, "HDML Style Guide for the Sprint PCS Wireless Web Browser™ Product Design & Usability Sprint PCS," Version 3.0, Oct. 2000.

Wireless Instant Messaging, http://www.tegic.com/wirelessIM.html, printed from the World Wide Web on Apr. 19, 2001.

QuickStart, http://www.aol.com/aim/wireless/aim_mobile_web/using_quickstart.html, printed from the World Wide Web on Apr. 19, 2001.

AIM Mobile Quick Reply, http://www.aol.com/aim/wireless/aim_mobile/web/using_quick_reply.html, printed from the World Wide Web on Apr. 19, 2001.

Research in Motion Products, http://www.rim.net/products/handhelds/specification/index.shtml, printed from the World Wide Web on Apr. 26, 2001.

* cited by examiner

*Primary Examiner*—Steven Sax (57) ABSTRACT

A method and system for assisting a user to engage in a microbrowser-based interactive chat session. The microbrowser displays a conversation choice card comprising (i) a history-of-communications and (ii) a number of choice-items related to the chat session. The use of a conversation choice-card conveniently reduces the number of keystrokes that a user might otherwise need to carry out various functions related to the chat session. It also may cut the number of keystrokes required to perform interactive chat functions.

23 Claims, 7 Drawing Sheets

METHOD AND SYSTEM FOR ASSISTING A USER TO ENGAGE IN A MICROBROWSER-BASED INTERACTIVE CHAT SESSION

BACKGROUND OF THE INVENTION

1. Field of the Invention

The present invention relates to telecommunications services and more particularly to a method and system for assisting a user to engage in an interactive chat session on a wireless handheld device.

2. Description of Related Art

Communication is a basic function of the human race. Society would be unable to function without people being able to communicate with each other. Whether it is for business or for pleasure, communication is essential to our everyday life. Although people have been communicating for over a millennium, the ability to communicate with one another over long distances is a more recent advance. Telecommunications refines the "art and science" of communication.

Telecommunications technology offers people a number of ways to interact with each other. The wireless handheld device is one of the more popular modes of communication. The wireless handheld device may be a cellular telephone, pager, or personal digital assistant (PDA), for example, that an individual may readily carry to communicate with others. The beauty of such devices is that they facilitate communication between individuals in a variety of ways, for instance, by voice and by text.

The most familiar handheld device may be the cellular telephone. For over a decade, individuals have been using the cellular telephone to chat with friends and family. The cellular telephone permits a user to communicate with another via voice. More recent advances, however, have moved the news of communication beyond that of using voice. The modem handheld wireless device may have a display screen and a character-entry device. The display screen may include, for example, a Liquid Crystal Display (LCD). The character-entry device may include, for example, a standard 12-key Dual Tone Multi-Frequency (DTMF) keypad, a keyboard, a touch interface, a touch interface with handwriting recognition, a touch interface with virtual character-entry device, or a voice recognition system. The result of these features is that the wireless handheld device has become a multi-functional device facilitating text-based communications.

For example, the wireless handheld device may enable a user to engage in short message services (SMS). SMS is analagous to e-mail on a desktop computer. A user can send short written text messages to and from a wireless handheld device without actually establishing an active call session with another entity. In general, SMS allows a person to type a desired message, indicate a destination (such as a mobile identification number), and transmit an SMS message encapsulating the desired text message. The telecommunications network then transfers the message to the intended destination.

A. Microbrowser

Only recently has wireless telecommunications sufficiently advanced to permit wireless connectivity over the Internet. Landline-based computers have been used for many years to access the Internet. A more recent development, however, is the ability for wireless handheld devices to connect to the Internet. The microbrowser is one application that enables a wireless handheld device to exchange instructions with network devices on the Internet. For example, the microbrowser may exchange instructions with a server to perform functions requested by the user. The microbrowser may also interpret instructions received by the server that describe the layout and content of the display screen. The method in which a microbrowser communicates with the server typically conforms to a standard protocol. One example of such a protocol is the Wireless Application Protocol (WAP).

WAP defines the architecture for exchanging content between a wireless handheld device, a gateway, and a server. WAP typically employs a markup language for facilitating the transfer of content from the server to the wireless handheld device running a microbrowser. The markup language is a set of instructions for instructing the microbrowser to perform a particular function. For example, the markup language may instruct a microbrowser as to how to display text, when to request user input, or how to send data to a server. The language that WAP uses is Wireless Markup Language (WML). Other languages that a microbrowser may interpret include Handheld Device Markup Language (HDML) and Compact Hyper-Text Markup Language (cHTML).

"Tags" are generally the instructions of the markup language. Commonly, a "tag document" embodies at least one tag (e.g. instruction). The microbrowser may interpret the tags in the tag document and display the translated document on the display screen. In WML and HDML, the at least one tag that describes the layout of one display screen is typically referred to as a card. If at least one tag document embodies tags describing more than one card, the at least one tag document may be referred to as a "deck of cards." A user navigates in the microbrowser environment by moving through the deck of cards. The cards may comprise information stored on the server or work in conjunction with applications residing on the server, thus permitting the user to access information resident on the server.

Typically, a card sent by the server may also be encoded to program the use of softkeys resident on the handheld device. A softkey is a programmable key that accepts input from the user. The handheld device may have one or two softkeys located below the display screen and under a label that identifies the function of the softkey. A card may program one of the two softkeys on the handheld device as a "primary key"—typically the left key with functionality related to operating the microbrowser. For example, a card may program the primary key to be a navigation key, which the user can press to browse another card.

Below is an example of an HDML tag document. It is a deck comprising three cards that each describes the weather for a particular day. The user may navigate through the cards in the tag document by using the softkeys to browse each card. The microbrowser may interpret the appropriate card and display the Hi and Lo temp on the specified day on the display of the handheld device.

<HDML VERSION=3.0>
<DISPLAY>
<ACTION TYPE=ACCEPT LABEL=Tues TASK=GO DEST=#tues>
Current temps
<BR>Hi: 60
<BR>Lo: 28
</DISPLAY>

```
<DISPLAY NAME=tues>
<ACTION TYPE=ACCEPT LABEL=Wed TASK=GO
   DEST=#wed>
Tuesday temps
<BR>Hi: 78
<BR>Lo: 36
</DISPLAY>
<DISPLAY NAME=wed>
Wednesday temps
<BR>Hi: 80
<BR>Lo: 40
</DISPLAY>
</HDML>
```

B. Cards

Text cards, text-entry cards, and choice cards are three common types of cards that microbrowsers display. The text card is a card that may contain text viewable on the display screen of the handheld device. The above code sample is an example of a text card. A user of a handheld device may view the weather for a certain day on the display screen as text. The text-entrry card is another microbrowser card. Using the character-input device, the text-entry card may enable the user of a handheld device to create, modify, or otherwise edit text. The user may enter text in a text-entry segment of the card, and the microbrowser may then send the text to the server.

Typically, the text-entry card comprises at least one title segment, having the title of the card, and at least one text-entry segment for entering text. If the text in the title segment is too long for the display screen to display it in full, a browser will conventionally default to display just as many of the last lines of the title as will fit on the display screen, together with the text-entry segment. A user may then use scroll keys, for instance, to scroll through the title segment so as to have the microbrowser present more of the title. Conversely,-scrolling past the end of the title may also permit the user to view more of the text-entry segment.

The microbrowser may also display a choice card. Like the entry card, the choice card has a title segment, which usually identifies the subject matter of the choice card. The choice card, however, has a list of selectable options instead of a text-entry segment. Each choice-item is typically accompanied by a corresponding number. The user may select an item on the list by pressing the corresponding number key on the numeric character-entry device. Alternatively, the user may scroll to the item (usually by highlighting it) and then press a softkey to engage the desired function. In response, the card may cause the browser to display another card or to take another designated action associated with the selected item.

Again, if the title segment of the choice card is too long to be presented at once, the microbrowser may conventionally default to display as many of the last lines of the title as will fit on the display screen followed by one or more of the choice-items. The presence of a numbered choice-item on the display screen may conveniently signify to a user that the user may use scroll keys to scroll down so as to view additional choice-items encoded in the card.

C. Instant Messaging

A microbrowser-equipped wireless handheld device is well situated to provide users with convenient access to interactive "chat" sessions. In an interactive chat session, a user may engage in a conversation with a remote entity (e.g., person), by sending and receiving text messages via the microbrowser. The interaction may be, but need not be, in real-time.

Through use of a microbrowser, a user may generate a text message and then have the microbrowser send the message via the telecommunications network to a remote entity. Similarly, a gateway on the telecommunications network may receive incoming messages from the remote entity and may forward them to the microbrowser for presentation to the user. Therefore, an effective user interface to the microbrowser enables a user to efficiently conduct an interactive chat session.

SUMMARY

The present invention stems from a realization that engaging in an interactive chat session through a conventional wireless handheld device may be difficult, even if the handheld device is equipped with a microbrowser. A user should be able to rapidly enter, transmit, and view text messages on the handheld device in order to conveniently engage in an interactive chat session. Of course, many wireless handheld devices have small display screens and minimally useful character-entry devices. Therefore, it would be advantageous to have a simple and robust user interface to facilitate interactive chat sessions.

One way to present an interactive chat session on a wireless handheld device is to use a text-entry card as a main conversation card. The text-entry card may be set to include a history-of-communications (e.g., the last lines of the conversation between chat-session participants) in the title segment and to provide a response-entry field in the text-entry segment (where a user may enter a new message for the microbrowser to transmit). The text-entry card may, in turn, be encoded to define a MENU softkey which, when actuated, directs the microbrowser to call up a MENU choice card. The MENU choice card may provide the user with various selectable functions related to the chat session, for example, an option to type a message, an option to select a canned message, an option to refresh the history-of-communications, and an option to close the chat session.

Although such an interface is workable, it forces a user to press a relatively large number of keys in order to accomplish many basic chat functions. Therefore, a more efficient arrangement is desired.

According to an exemplary embodiment of the present invention, a microbrowser may display a choice card as a main conversation card. The choice card may conveniently. include, as its title segment, a history-of-communications, and conveniently include, as its choice-items, a number of functional choices related to the chat session. For example, the choice-items may comprise an option to select a canned message, an option to type a message, an option to refresh the history-of-communications, and an option to close the chat session. The conversation choice card may be encoded in a markup language such as WML or HDML, for instance. But other markup languages and other "non-cards" constructs may be used instead.

The use of a conversation choice card (or the like) as a main conversation card conveniently cuts the number of keystrokes required to perform various functions associated with interactive chat session. The conversation card provides, in a single display block, both the it. history-of-communications and choices related to the chat session without requiring the user to call up a separate card. As a result, for instance, the number of keystrokes to perform the close chat and update conversation functions is cut in half, and the number of keystrokes to perform other functions is decreased as well.

Thus, in one respect, an exemplary embodiment of the present invention may take the form of a user interface for assisting in providing an interactive chat session on a wireless handheld device. The wireless handheld device may include a display screen and at least one actuator. The user interface may have at least one history-of-communications segment displayed on the display screen and at least one choice-item segment displayed on the display screen. The history of communications segment may comprise communications between the wireless handheld device and at least one remote entity. The at least one choice-item segment may comprise a plurality of choice-items each selectable by the user and each defining an action-item related to the chat session.

The display screen may initially display the at least one history-of-communications segment with at least a first choice-item in the at least one choice-item segment. The contents in the at least one history-of-communications segment and the at least one choice-item segment may be scrollable on the display screen. The at least one choice-item segment may include various selectable functions related to the chat session. Such functions may include an option to type a message, an option to select a canned message, an option to refresh the history-of-communications, and an option to close the chat session.

Further, the wireless handheld device may be equipped with a microbrowser and display. The display may be at least three rows of characters high and/or at least twelve characters wide. The microbrowser may be configured to display choice cards encoded with the at least one history-of-communications segment and the at least one choice-item segment. Still further, the choice cards may be encoded in a markup language such as WML, HDML, or cHTML.

The at least one history-of-communications segment may have at least one outgoing message sent from the wireless handheld device to at least one remote entity. Alternatively, or additionally, the at least one history-of-communications segment may have at least one outgoing message and at least one incoming message sent between the wireless handheld device and the at least one remote entity. Each incoming message may further have an indication of a respective sender of the message.

In another respect, an exemplary embodiment may take the form of a method for assisting a user to engage in an interactive chat session via a device with a display screen and at least one actuator. The method may comprise displaying a display block having at least one history-of-communications segment and at least one choice-item segment. The at least one history-of-communications segment may comprise a history of communications between the wireless handheld device and at least one remote entity. The at least one choice-item segment may comprise a plurality of choice-items, each selectable by a user through actuating at least one actuator and each defining an action item related to the chat session. The method may also comprise initially displaying the at least one history-of-communications segment with at least a first choice-item of the at least one choice-item segment. Still further, the method may include presenting a scrollable view of the contents in the at least one history-of-communications segment and the at least one choice-item segment.

The at least one choice-item segment may comprise various selectable functions related to the chat session. Such functions may include an option to type a message, an option to select a canned message, an option to refresh the history-of-communications, and an option to close the chat session.

In addition, the displaying of the display block may comprise displaying a choice card. The choice card may define the at least one history-of-communications segment and the at least one choice-item segment. The method may also include encoding the choice card in a markup language such as WML, HDML, or cHTML.

The displaying of the display block may comprise displaying at least one outgoing message sent from the device to the at least one remote entity. Alternatively, or additionally, the displaying of the display block may comprise displaying at least one outgoing message and at least one incoming message sent between the wireless handheld device and the at least one remote entity. Each incoming message may further have an indication of a respective sender of the message.

In yet another respect, an exemplary embodiment of the present invention may take the form of a user interface for assisting in providing an interactive chat session on a device. The device may comprise a display screen and at least one actuator. The user interface may have a choice card with a display block having at least one history-of-communications segment and at least one choice-item segment. The choice card may be displayed on the display of the device. The history of communications segment may include a history-of-communications between the device and at least one remote entity. The at least one choice-item segment may include a plurality of choice items each selectable by a user and each defining an action item related to the chat session.

In yet another respect, an exemplary embodiment of a method for assisting a user to engage in an interactive chat session may include displaying a choice card. The choice card may comprise a display block having at least one history-of-communications segment and at least one choice-item segment. The history of communications segment may include a history-of-communications between the device and at least one remote entity. The at least one choice-item segment may include a plurality of choice items each selectable by a user and each defining an action item related to the chat session.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Network Architecture

Figure 1:
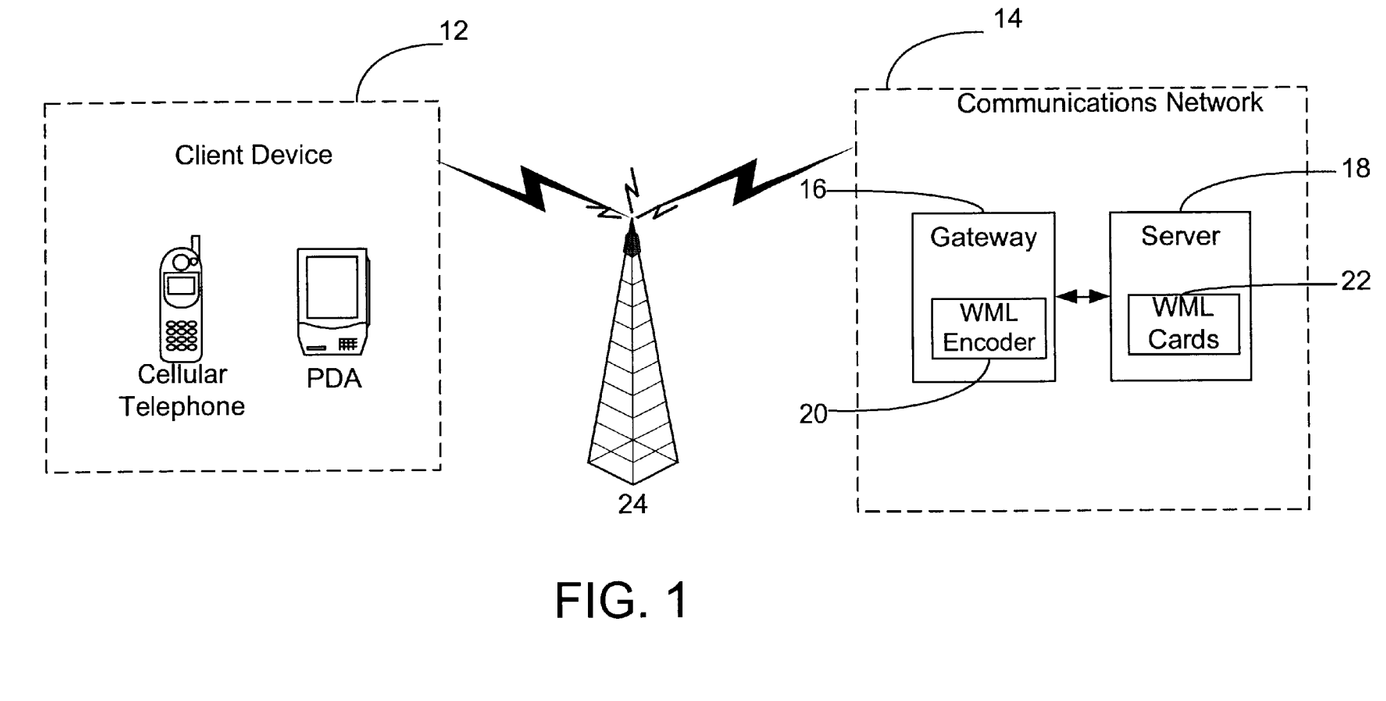
FIG. 1 illustrates a client device and a server configured to communicate over a communications network.

Referring to the drawings, FIG. 1 illustrates a simplified block diagram of a telecommunications network in which an exemplary embodiment of the present invention may be employed. By way of example, the architecture of FIG. 1 assumes that a client device will be running WML in a WAP environment. This and other arrangements described herein are shown for purposes of illustration only.

Those skilled in the art will appreciate that other architectures and protocols may be used instead, additional elements may be added to these architectures and protocols, and some elements may be omitted altogether. Further, as in most telecommunications applications, those skilled in the art will appreciate that many of the elements described herein are functional entities that may be implemented as discrete components or in conjunction with other components, in any suitable combination and location.

Still further, various functions described herein as being performed by one or more entities may be carried out by a processor executing appropriate instructions. Provided with the present disclosure, those skilled in the art can readily prepare the appropriate instructions to perform such functions.

The WAP architecture shown in FIG. 1 enables a client device 12 to communicate with a server 18 residing in a communications network 14. The WAP architecture comprises three main components: the client device 12, a gateway 16, and the server 18. The client device 12 is typically a wireless handheld device. It may be, for instance, a cellular telephone, a PDA, or a pager, but it could take other forms as well. The server 18 is typically a computer residing on a network such as the Internet. It may be, however, a collection of devices on the network that together function as a server. The server 18 typically has the ability to communicate with the wireless handheld device 12 via the gateway 16 and wireless channel 24. The server 18 typically stores tag documents that instruct the microbrowser running on the wireless handheld device 12 to display and/or accept input from the user. The tag documents may be written in a markup language such as WML, HDML, or cHTML. For purposes of illustration, however, the exemplary embodiments of the present invention will assume that WML cards 22 reside on the server 18. Of course other markup languages are possible and those skilled in the art will appreciate that other arrangements may be used instead.

The gateway 16 is the mechanism by which the server 18 and wireless handheld device 12 may communicate. The gateway 16 connects the wireless handheld device 12 to the server 18 by translating the communications protocol of the wireless handheld device 12 into a format understandable by the server 18, and vice-versa. The gateway 16 transmits cards 22, typically WML decks, to the wireless handheld device 12 via a WML encoder 20. The WML encoder 20 may translate the WML cards 22 into a format compatible with wireless transmission. Typically, the WML encoder 20 encodes the cards 22 using a binary data format to permit robust, error-free wireless transmission to the wireless device 12.

Figure 2:
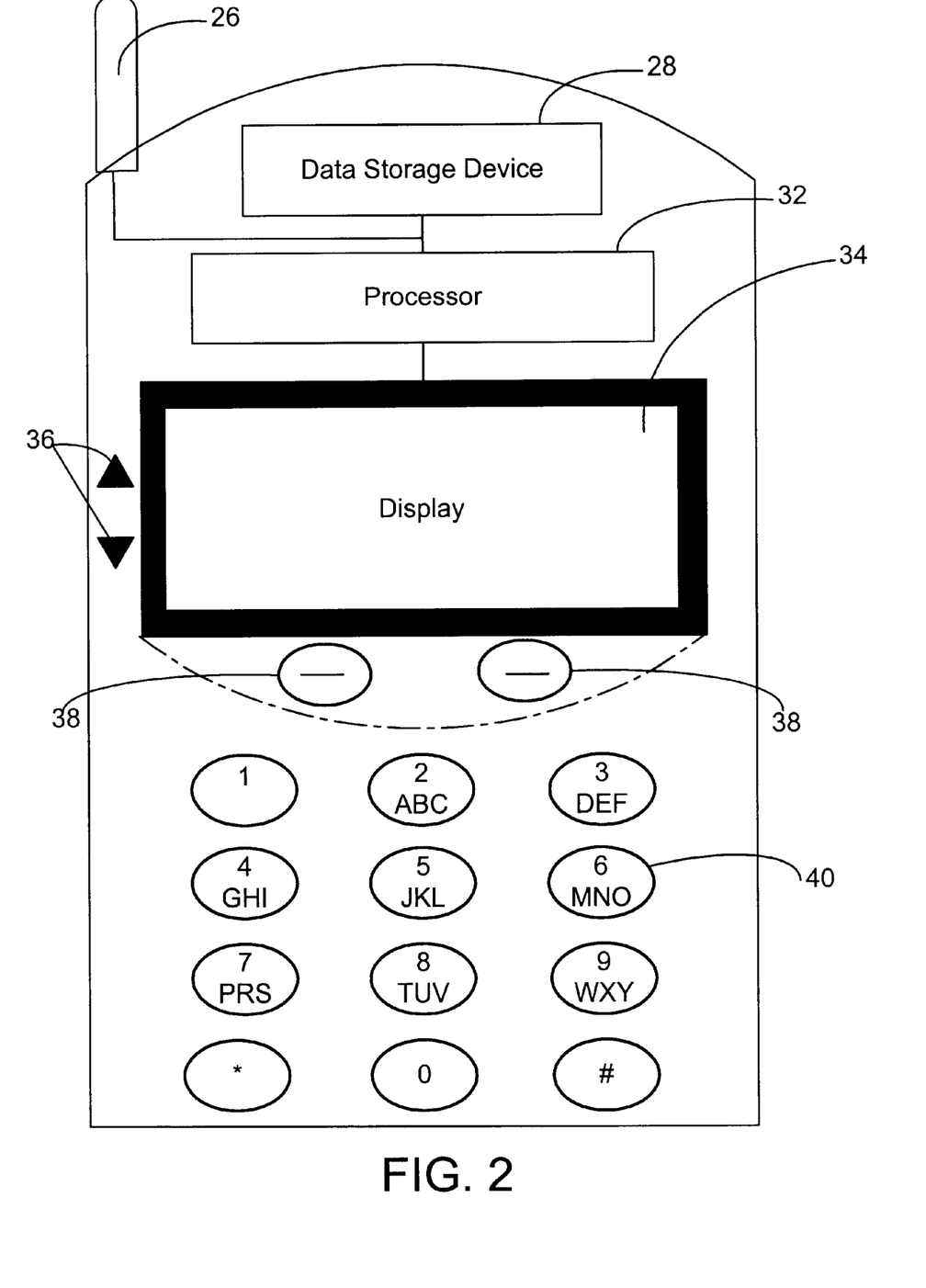
FIG. 2 illustrates a wireless handheld device.

The wireless handheld device 12, typically a handheld unit, enables a user to conduct an interactive chat session. FIG. 2 illustrates an exemplary embodiment of a wireless handheld device. It may be a processor-based device for communicating via a wireless channel with the server 18. Other arrangements are also possible.

The wireless handheld device typically has a processor 32 coupled to a data storage device 28, for example memory. A processor may execute microbrowser software residing in the data storage device 28. The wireless handheld device may also have a communications interface 26. The communications interface 26 may be coupled to the data storage device 28 and the processor 32. The communications interface 26 may transmit and receive data from the wireless network.

The device may also have a display 34 and a character-entry device. The display 34 may display, for example, characters minimally limited to 3 rows by 12 characters or graphics (e.g. pictorial representations of objects). The character-entry device may be, for example, a traditional numeric telephone character-entry device, a keyboard, a touch interface, a touch interface with handwriting recognition, a touch interface with virtual character-entry, or a voice recognition system. If the character-entry device is a traditional 12-key DTMF keypad 40, other letters not conventionally found on a numeric character-entry device may be provided on the keypad. For instance, the key for the digit "7" may represent the letter "Q" and the digit "9" may represent the letter "Z." Furthermore, there may also be a pair of scroll keys 36 for displaying text that may not fit at once in the viewable area of the display screen 34. Still further, the handheld device may have one or two softkey actuators 38 that the user may use to trigger actions by the microbrowser.

2. Use of a Text-Entry Card as the Main Conversation Card

A wireless handheld device running a microbrowser and communicating with a server is well-situated to provide users with convenient access to interactive chat sessions. The microbrowser improves the effectiveness of interactive chat sessions by providing a flexible user interface.

A microbrowser displaying tag documents may facilitate the interaction of a user with the wireless handheld device in an interactive chat session. Tag documents are cards that a server and wireless handheld device may exchange. In an interactive chat session, the first card that may be displayed on the handheld device may be a main conversation card. The main conversation card may comprise one or more actions that a user may take with respect to the chat session.

As used herein, the term "display" (and variations of that term) can broadly be defined as to "present for viewing." In this regard, an object may be "displayed" even if only part of the object is viewable at a time, provided that the remainder of the object can be viewed as well, e.g., by a user scrolling through the object or moving a sliding window over the object. Thus, for example, a text document or graphic can be "displayed" on a display screen, even though only a portion of the text document or graphic is actually viewable at once, provided that the remainder of it can be viewed as well, through the use of a scroll bar or scroll keys, for instance.

Figure 3:
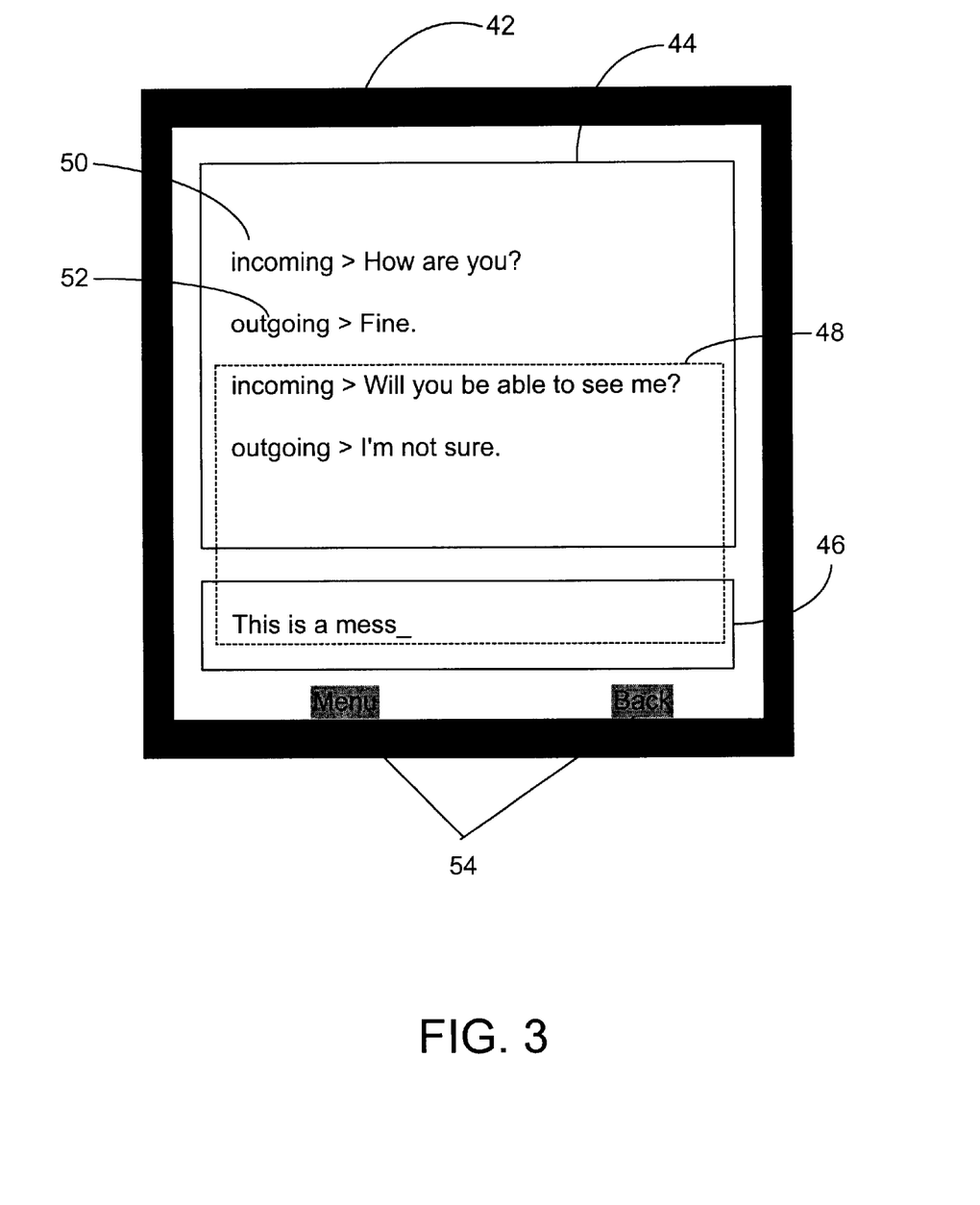
FIG. 3 illustrates a text-entry card.

One type of card that may be well suited as a main conversation card is a text-entry card. FIG. 3 illustrates an exemplary text-entry card. The text-entry card comprises a display block 42 that defines segments displayable on the display screen of the handheld device. For example, the display block 42 may include a title segment 44, a text-entry segment 46, and softkey labels 54. Other arrangements, however, are also possible.

To facilitate an interactive chat session, the title segment 44 of the text-entry card may be set as a history-of-communications and the text-entry segment 46 may be set as a response-entry field. The history-of-communications may include at least one incoming message 50 received by the handheld device from at least one remote entity, at least one outgoing message 52 sent from the handheld device to the at least one remote entity, and an identification of the respective sender (e.g. name of sender) of the incoming message.

The display block 42 of the card may be displayed on the display screen of the handheld device. A display window 48 in the display block 42 may facilitate the display of the display block 42. The display window 48, sized according to the displayable area of the display screen, may define what may be viewable on the display screen of the handheld device. The contents of the display block 42 may be shifted within the display window 48 so that the contents may be viewable on the display screen. For example, if the contents in the title segment 44 and the text-entry segment 46 are too large to be viewed (at once) on the display screen, the card may be programmed so that a portion of the contents in the title segment 44 and all or a portion of the contents in the text-entry segment 46 may be viewable on the display screen. To view the hidden portions, the desired contents may be shifted into the display window.

Figure 4:
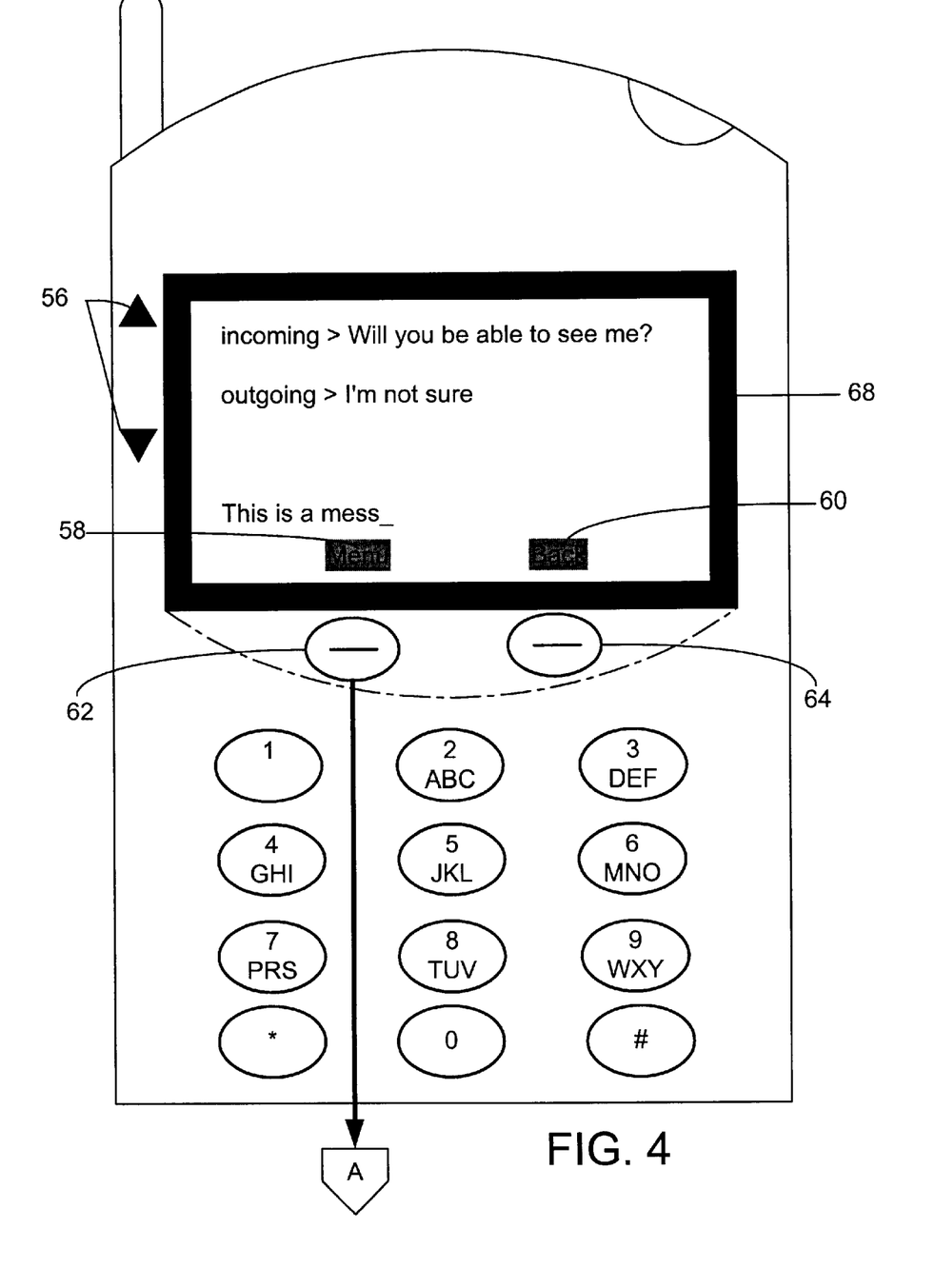
FIG. 4 illustrates a text-entry card as displayed on a wireless handheld device.

FIG. 4 illustrates the result of displaying the contents of the display window 48 on a wireless handheld device. If the size of the display window 48 is smaller than the display block 42, only a portion of the display block 42 may be viewable on the display screen 68 at a time. The user may use the scroll keys 56 to shift other portions of the display block 42 within the display window 48 so as to view more of the title segment on the display screen 68. The user may similarly shift the display block 42 so as to view more of the text-entry segment 46.

By default, the display screen 68 may initially present the most recent lines of text from the conversation, followed by the response-entry field. The user may use the response entry field to enter a new message into the response-entry field and use the scroll keys 56 to view earlier portions of the history of communications.

The text-entry conversation card may be encoded with two softkeys. A label 58, 60 above each soft key 62, 64 on the display screen 68 of the handheld device may define the precise function of the keys. Even though the softkey labels 54 may not fall within the display window 48 of the display block 42, the handheld device may be configured to still display the softkey labels 58, 60 on the display screen.

One of the softkeys (e.g. the "primary key," typically the left key) may be a generic navigation key 62. The user may press the softkey to browse another card. The navigation key 62 may be further defined as a "Menu" softkey 58. The "Menu" softkey may cause the microbrowser to display a MENU card that provides the user with options to take with respect to the conversation. Conventionally, the microbrowser may assign another softkey 64 (e.g., the "secondary key"—usually the right key) to facilitate generic system (browser) functions such as "BACK"60 (to go to the previous card), "ALPHA"(to switch to between various types of text-entry e.g. numeric, symbolic, predictive, and alphabetic text-entry), or "CLEAR"(to clear the entry on the entry card).

Figure 5:
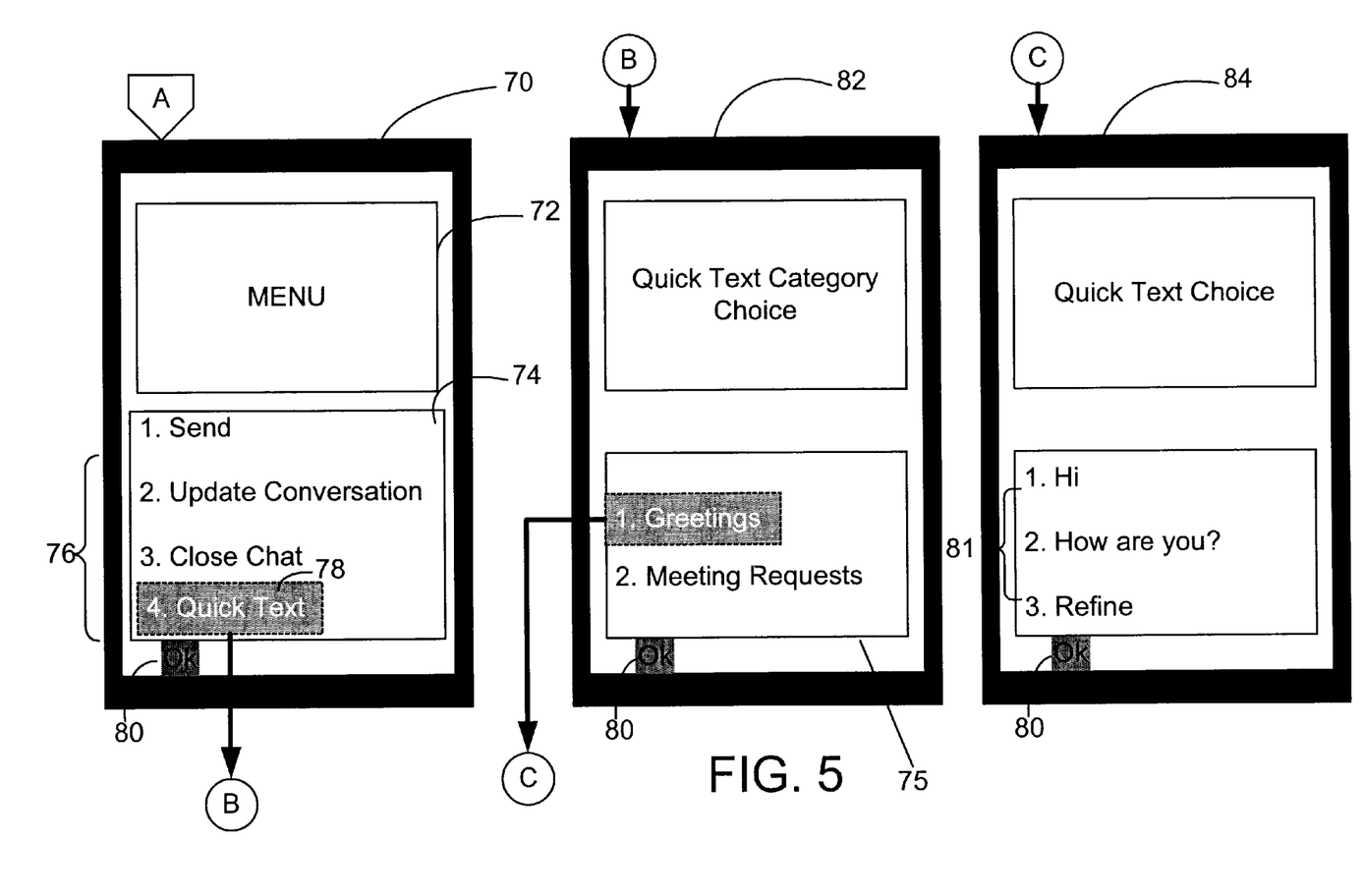
FIG. 5 illustrates a MENU choice card.

As noted above, the MENU card may take the form of a choice card. FIG. 5 illustrates an example of a MENU choice card 70. The MENU choice card may define a display block that includes at least one title segment 70 and at least one choice-item segment 74. The title segment 72 may generally describe the category of items in the at least one choice-item segment 74, e.g. Menu. The at least one choice-item segment 74 may define a plurality of selectable options or choice-items 76 related to the conversation.

The choice-items 76 may be numbered to signify that the card defines actions beyond simply appearing on the display screen. A corresponding single digit number may accompany each of the first nine choice-items in the at least one choice-item segment 74. To select a choice-item 76 from a choice card, a user may conveniently press the corresponding number key on a numeric character-entry device. (For instance, to select item "4" the user may press the "4" key on the character-entry device.) Alternatively, the user may use scroll keys to shift the display block under a highlight 78. The highlight 78 may be a shaded region overlaying the display block. The user may then press an "OK" softkey, identified by an associated label 80, or engage another designated actuator to select the highlighted item. In response, the microbrowser will display another card and/or take another designated action associated with the selected item.

In an interactive chat session, the MENU choice card 70 may have one or more choice-items 76, each of which may relate to the chat session in some way. By way of example, a MENU choice card in an interactive chat session may include the following choice-items:

1. Send
2. Update Conversation
3. Close Chat
4. Quick Text

In this arrangement, the user may press or select item "1" to Send the message typed in the entry card. In response, the microbrowser may bring up a text-entry card where the user may enter and send the desired message. (The text-entry card may in turn define a "SEND" softkey that a user may engage to cause the microbrowser to send an entered text message over the communications network.) Alternatively, the user may press or select item "2" to update the history-of-communications segment with the most recent messages or press or select item "3" to close the interactive chat session. The microbrowser would respond accordingly, pursuant to instructions defined by the card.

Still alternatively, the user may press or select item "4", the "Quick Text" choice-item. In response, the microbrowser may then display a Quick-Text Category choice card 82. The at least one choice-item segment 75 of the Quick-Text Category choice card 82 may define a number of canned messages categories selectable by the user. Each category may be linked to another Quick-Text Choice card 84, which may define a number of canned messages within the selected category.

For example, the Quick Text Category choice card 82 may have a category of Greetings or Meeting Requests. Thus, for instance, when the user selects (e.g. by highlight or numeric keypress) a category from the Quick Text Category choice card 82, the microbrowser may display the choice-card 84, which may define as choice-items 81 the canned messages "Hi" or "How are you?". In turn, when the user selects (again, e.g. by highlight or numeric keypress) one of the canned messages, the microbrowser may then return to display the main text-entry conversation card 42, with the selected canned message entered by default in the response-entry field 46.

Further, if the user wants to edit the canned message, the Quick Text choice card 84 may include a "Refine" choice-item or the like. The card may be linked to another choice card that presents further choices so as to allow the user to refine or expand the canned message in some way.

While these arrangement is workable, the process of using a text-entry card followed by a choice card forces a user to press a relatively large number of keys. For instance, to accomplish the following basic chat session functions, the user would need to press all of the indicated buttons:

To send a basic text message:

[Type the message]
1.     MENU (left softkey on entry card)
2.     Send ("1" key on MENU choice card)

To update a conversation history (get new messages)

1.     MENU (left softkey)
2.     Refresh Talk ("2" key on MENU choice card)

To close a conversation:

1.     MENU (left softkey)
2.     Close chat ("3" key)

To send a canned message:

1.     MENU (left softkey)
2.     Quick text ("4" key)
3.     Select category of text from the Quick text categories (e.g. "1" key)
4.     Select text from Quick text choice card (e.g., "1" key)
5.     Send ("1" key on MENU choice card)

Unfortunately, this arrangement is particularly burdensome. Therefore, a more efficient arrangement is desired that reduces the number of keystrokes to conduct an interactive chat session.

3. Use of a Choice-Card as the Main Conversation Card

According to an exemplary embodiment of the present invention, a choice card may be employed as a main conversation card. The conversation choice-card may comprise a history-of-communications segment and at least one choice-item segment listing a plurality of choice-items related to the chat session.

Figure 6A:
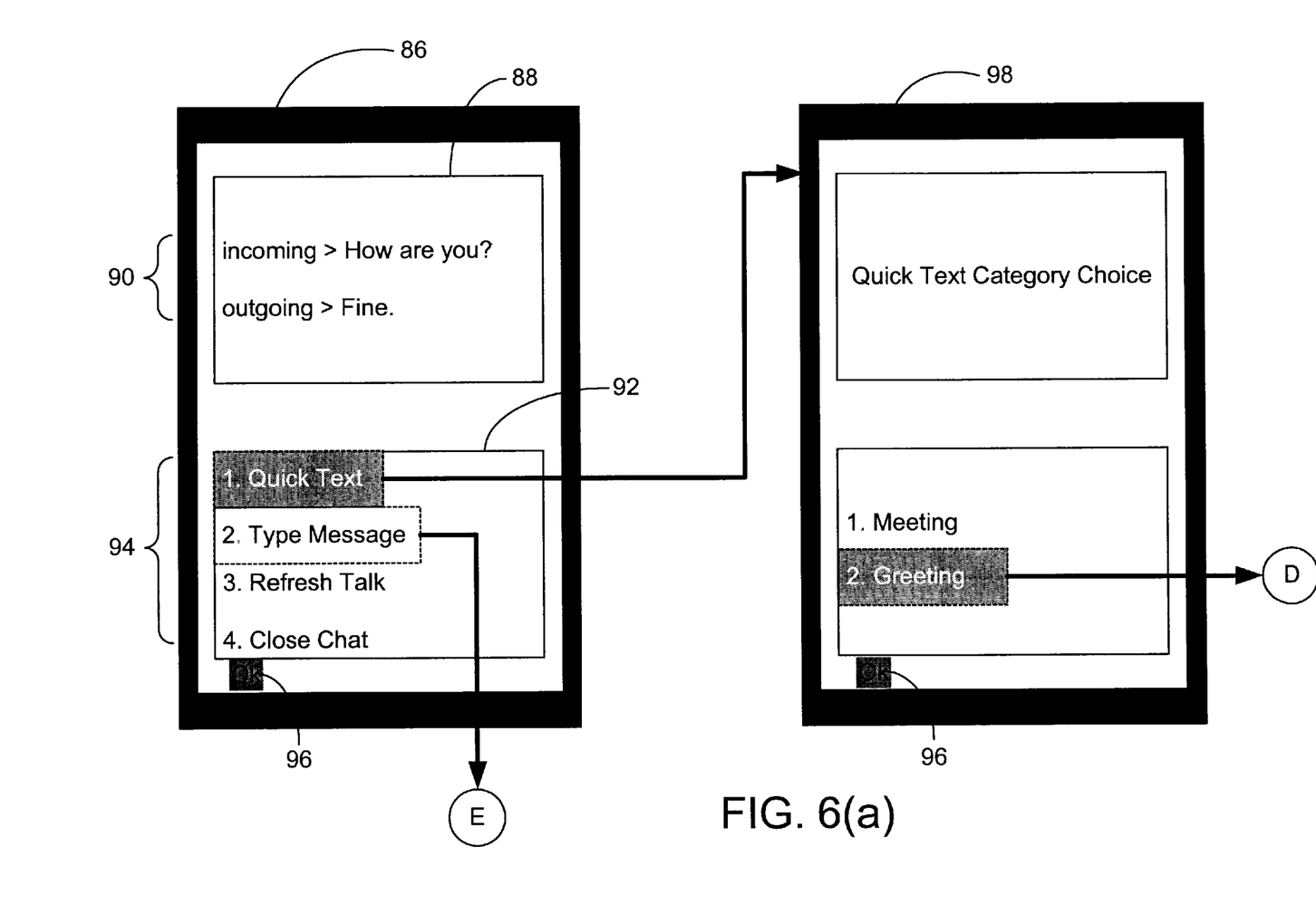
FIGS. 6(a) and 6(b) illustrate a main conversation choice card in accordance with an exemplary embodiment of the present invention.
Figure 6B:
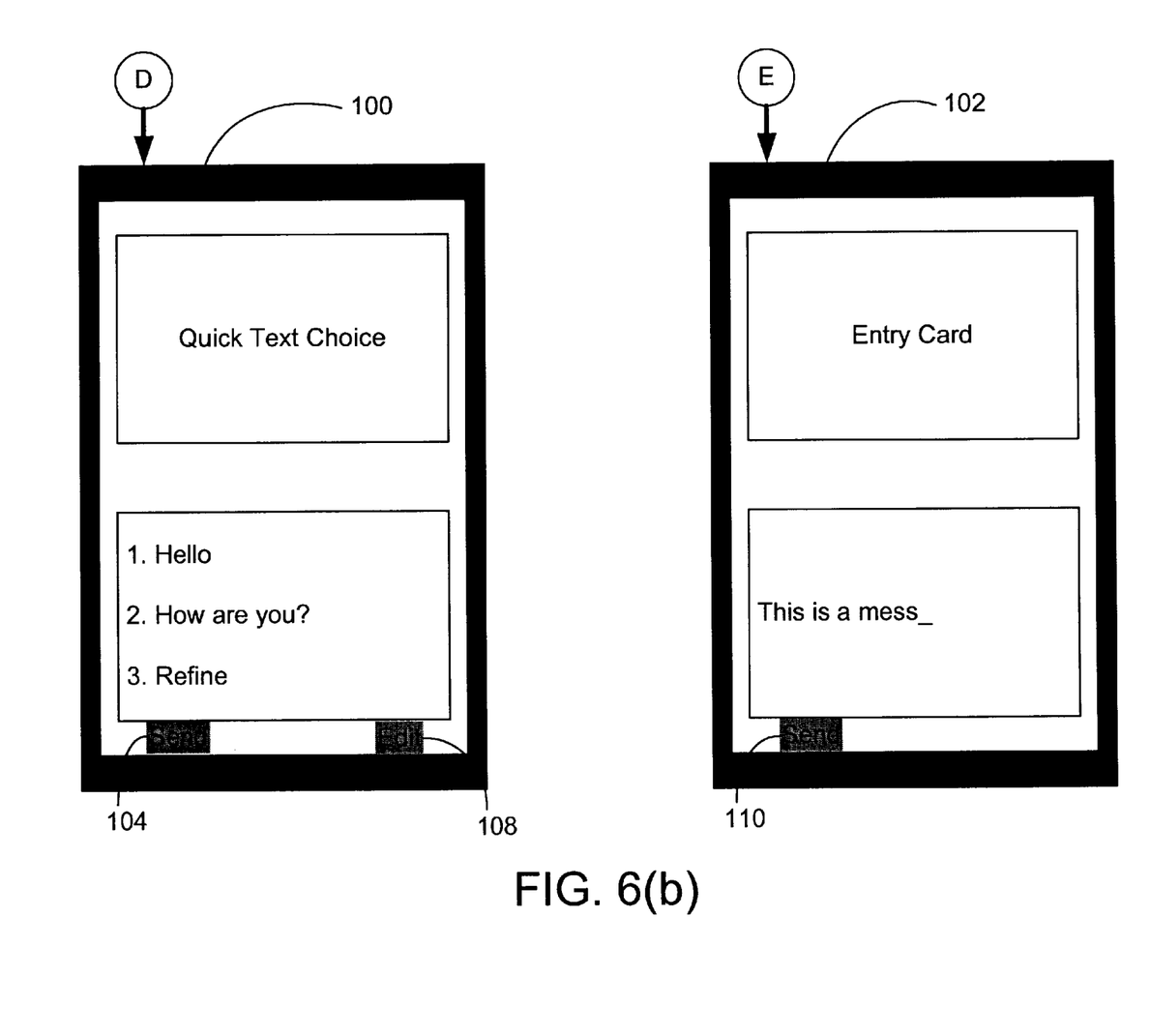

FIGS. 6(a) and 6(b) illustrate an exemplary embodiment of the main conversation choice card 60. Referring to FIGS. 6(a) and 6(b), the conversation choice card 86 may have a display block set with at least one history-of-communication segment 88 and at least one choice-item item segment 92. The at least one history-of-communication segment 88 may have a history-of-communications (or as much as memory would permit or as desired) and the at least one choice-item segment 92 may have at least one choice-item 94 related to the chat session. Similar to the text-entry card, the at least one history of the conversation segment may include at least one incoming message received by the handheld device from a remote entity and at least one outgoing message sent from the wireless handheld device to the remote entity. The incoming message may also include an identification of the respective sender (e.g. name of sender) -of the message.

In the exemplary embodiment of the present invention, the main conversation choice card 86 may cause the microbrowser to initally present at least a portion of the history of communications segment 88 and at least one choice-item from the at least one choice-item segment 92. A user may then use the scroll keys, for instance, to move through the display block of the choice card, so as to view more of the history of communications segment or more of the choice-item segment.

The use of a choice card as a main conversation card, rather than a text-entry card, permits the user to more readily conduct a variety of actions related to the chat session. The user does not have to separately call up a menu list (e.g., a MENU choice card) of choices for the chat session.

In the exemplary embodiment, the choice-items 94 on a conversation choice card 86 may include items defining functions related to the chat session. The specific functions may take a variety of forms and may vary depending on the specific implementation of the chat system. For purposes of illustration, however, the conversation choice card 86 may include the following choices:

1. Quick Text
2. Type Message
3. Refresh Talk
4. Close Chat

The choice card may be encoded such that each choice-item may be selectable by pressing the numeric digit associated with the item. Alternatively, each choice-item may be selected by highlighting the desired item (using the scroll keys) and pressing an OK softkey identified by an associated label 96 on the display screen.

If the "Quick Text" choice-item is selected, it may be linked, via a "Quick Choice Category" 98 card, to a "Quick Text Choice" card 100. The Quick Text Choice card 100 may allow the conversation participant to readily select a canned text message, such as "Hello" or "How are you?" in a specific category. The user may be able to send the canned message when he selects the desired message. The Quick Text Choice card 100 may also be encoded to define an EDIT softkey, identified by associated label 108, and a SEND softkey, identified by associated label 104. The EDIT softkey may be used to edit the selected message. The SEND softkey may be used to send the edited quick text message. Alternatively, the Quick Text Choice card 100 may include a Refine choice-item that is linked to an entry card or to another Quick Text card, to allow the user to refine (e.g., edit) the canned message before sending it.

The "Type Message" item may be linked to an Entry card 102, which may allow the user to type a least one outgoing message. The Entry card 102, a text-entry card, may. be encoded to define a "SEND" softkey and associated label 110 which may allow the user to type and send a message. The "Refresh Talk" item may be linked to WML code underlying the conversation choice card 86, that causes the microbrowser to update the conversation history 90 on the conversation choice card 86 (so as to retrieve new messages from a server, for instance.) The "Close Chat" item may be linked to WML code underlying the conversation choice card 86, that clears the conversation history 90 and closes the chat session (e.g., by sending a signal to the server).

Note that at least one of these action items (softkey or choice-items) may be site-specific. That is, at least one item may be specifically related to the fact that a chat session is underway, which is a network-site-specific function rather than a generic function local to the browser or handheld device. An example of a generic function, in contrast, is an "OK" softkey, which may generically cause the browser to activate the primary softkey and execute whatever choice-item is selected. Another example of a generic function is a navigation action, such as "BACK," which may generically cause the browser to navigate to the previously displayed card. Still another example of a generic function is an "ALPHA" softkey, which may generically cause the browser to toggle between alphanumeric and numeric text-entry.

The advantage of using the choice card 86 as the main conversation card is that it enables a user to conveniently carry out a variety of conversation-related functions, by pressing a relatively few number of keys. For instance, with the exemplary embodiment, the user may accomplish the following basic chat session functions by pressing the indicated buttons:

---

To send a basic typed text message:

1. Select Type Message ("2" key on the choice card)
   [Type the message]
2. Press SEND (left softkey on the choice card)

To send a canned message:

1. Select Quick Text ("1" key on choice card)
2. Select category of text from the
   Quick Text Category (e.g. "1" key)
3. Send text from Quick Text Choice card (e.g., "1" key)

To update a conversation history (get new messages)

1. Select Refresh Talk ("3" key on MENU choice card)

To close a conversation:

1. Select Close chat ("4" key on the choice card)

---

The following table compares the number of keystrokes that are required to carry out these various functions where the main conversation card is a text-entry card versus a choice card, as described above.

| Conversation Action Item | Keystrokes with Entry Card | Keystrokes with Choice Card |
| --- | --- | --- |
| Send a basic text message | 2 | 2 |
| Send a quick text message | 5 | 3 |
| Update conversation | 2 | 1 |
| Close conversation | 2 | 1 |

As this table illustrates, the use of a conversation choice card can cut the number of keystrokes required for some functions in half and can decrease the number of keystrokes required for other functions.

An exemplary embodiment of the present invention has thus been illustrated and described. It will be understood, however, that changes and modifications may be made to the invention as described without deviating from the spirit and scope of the invention, as defined by the following claims.

I claim:

1. A user interface for providing an interactive chat session on a wireless handheld device, the wireless handheld device having a display screen and at least one actuator, the user interface comprising:
   (a) a display block including:
      (1) at least one history-of-communications segment displayed on the display screen, the at least one history-of-communications segment having communications between the wireless handheld device and at least one remote entity; and
      (2) at least one choice-item segment displayed on the display screen, the at least one choice-item segment having a plurality of choice-items each (i) selectable by a user through actuation of the at least one actuator and (ii) defining an action item related to the chat session;
         wherein only a portion of the display block is viewable on the display screen at any given time; and
   (b) a mechanism to allow the user to scroll through the display block to move some of the choice-items into view on the display screen while moving some of the communications out of view.

2. The user interface of claim 1, wherein the display screen initially displays (i) the at least one history-of-communications segment and (ii) at least a first choice-item of the at least one choice-item segment.

3. The user interface of claim 1, wherein the at least one choice-item segment includes (i) a quick-text choice-item, (ii) a type-reply choice-item, (iii) a refresh option, and (iv) a close-chat choice-item.

4. The user interface of claim 1, wherein the wireless handheld device is equipped with a microbrowser application.

5. The user interface of claim 1, wherein the display screen is at least three rows of characters high.

6. The user interface of claim 1, wherein the display screen is at least twelve characters wide.

7. The user interface of claim 1, wherein a choice card defines the user interface, the choice card including the at least one history-of-communications segment and the at least one choice-item segment.

8. The user interface of claim 7, wherein the choice card is encoded in a markup language.

9. The user interface of claim 8, wherein the markup language is selected from the group consisting of WML, HDML, and cHTML.

10. The user interface of claim 1, wherein the at least one history-of-communications segment displayed on the display screen comprises at least one outgoing message sent from the wireless handheld device to the at least one remote entity.

11. The user interface of claim 1, wherein the at least one history-of-communications segment displayed on the display screen comprises at least one outgoing message and at least one incoming message that have been sent between the wireless handheld device and the at least one remote entity.

12. The user interface of claim 11, wherein the at least one history-of-communications segment displayed on the display screen comprises, in connection with each of the at least one incoming message, an identification of a respective sender of the message.

13. A method for assisting a user to engage in an interactive chat session via a device, the device having a display screen and at least one actuator, the method comprising:
   (a) scrollably displaying a display block on the display screen such that only a portion of the display block is viewable at a given time, the display block comprising:
      (1) at least one history-of-communications segment having communications between the device and at least one remote entity; and
      (2) at least one choice-item segment having a plurality of choice-items each (i) selectable by a user through actuation of the at least one actuator and (ii) defining an action item related to the chat session; and
   (b) in response to an indication from the user, scrolling some of the choice-items into view on the display screen while scrolling some of the communications out of view.

14. The method of claim 13, wherein displaying the display block comprises initially displaying (i) the at least one history-of-communications segment and (ii) at least a first choice-item of the at least one choice-item segment.

15. The method of claim 13, wherein the at least one choice-item segment comprises (i) a quick-text choice-item, (ii) a type-reply choice-item, (iii) a refresh option, and (iv) a close-chat choice-item.

16. The method of claim 13, wherein displaying the display block comprises displaying a choice card, the choice card defining the at least one history-of-communications segment and the at least one choice-item segment.

17. The method of claim 16 further comprising encoding the choice card in a markup language.

18. The method of claim 17, wherein encoding the choice card comprises encoding the choice card in a markup language selected from the group consisting of WML, HDML, and cHTML.

19. The method of claim 13, wherein displaying the display block comprises displaying at least one outgoing message sent from the device to the at least one remote entity.

20. The method of claim 13, wherein displaying the display block comprises displaying at least one outgoing message and at least one incoming message sent between the device and the at least one remote entity.

21. The method of claim 20, wherein displaying at least one incoming message comprises displaying, in connection with each of the at least one incoming message, an identification of a respective sender of the message.

22. A user interface for assisting in providing an interactive chat session on a device, the device comprising a display screen and at least one actuator, the user interface comprising:
   (a) a choice card displayed on the display screen, the choice card having a display block, the display block comprising:
      (1) at least one history-of-communications segment having a history-of-communications between the first device and at least one remote entity; and
      (2) at least one choice-item segment having a plurality of choice-items (i) each selectable by a user through actuation of the at least one actuator and (ii) defining an action item related to the chat session;
      wherein only a portion of the display block is viewable on the display screen at any given time; and
   (b) a mechanism to allow the user to scroll through the display block to move some of the choice-items into view on the display screen while moving some of the communications out of view.

23. A method of assisting a user to engage in an interactive chat session via a device coupled with a telecommunications network, the device having a display screen and at least one actuator, the method comprising:
   (a) scrollably displaying a display block of a choice card on the display screen such that only a portion of the display block is viewable on the display screen at a given time, the display block of the choice card comprising:
      (1) at least one history-of-communication segment having a history-of-communications between the first device and at least one remote entity; and
      (2) at least one choice-item segment having a plurality of choice-items each (i) selectable by the user through actuation of the at least one actuator and (ii) defining an action item related to the interactive chat session;
   (b) in response to an indication from the user, scrolling some of the choice-items into view on the display screen while scrolling some of the communications out of view.

* * * * *